UNITED STATES PATENT OFFICE.

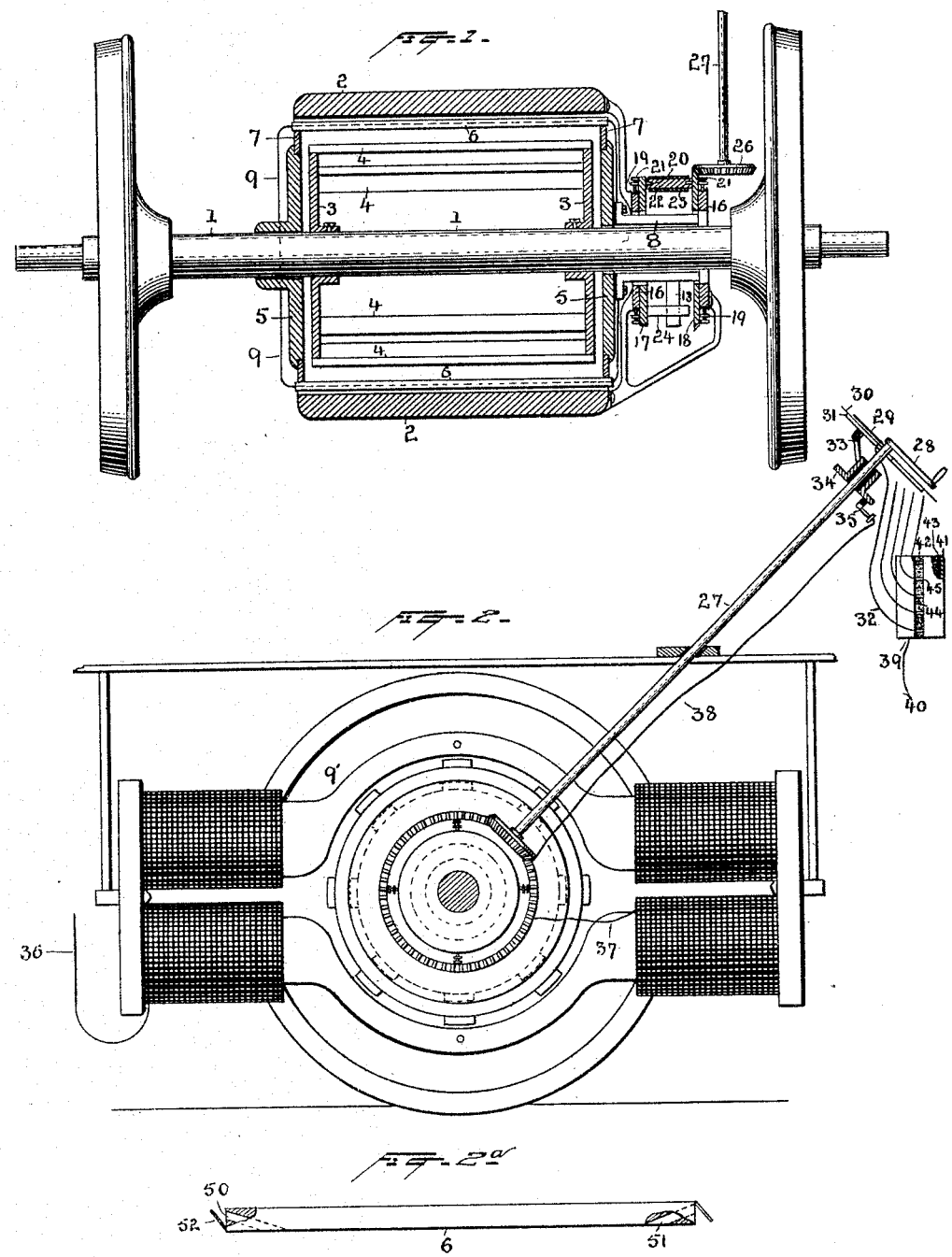

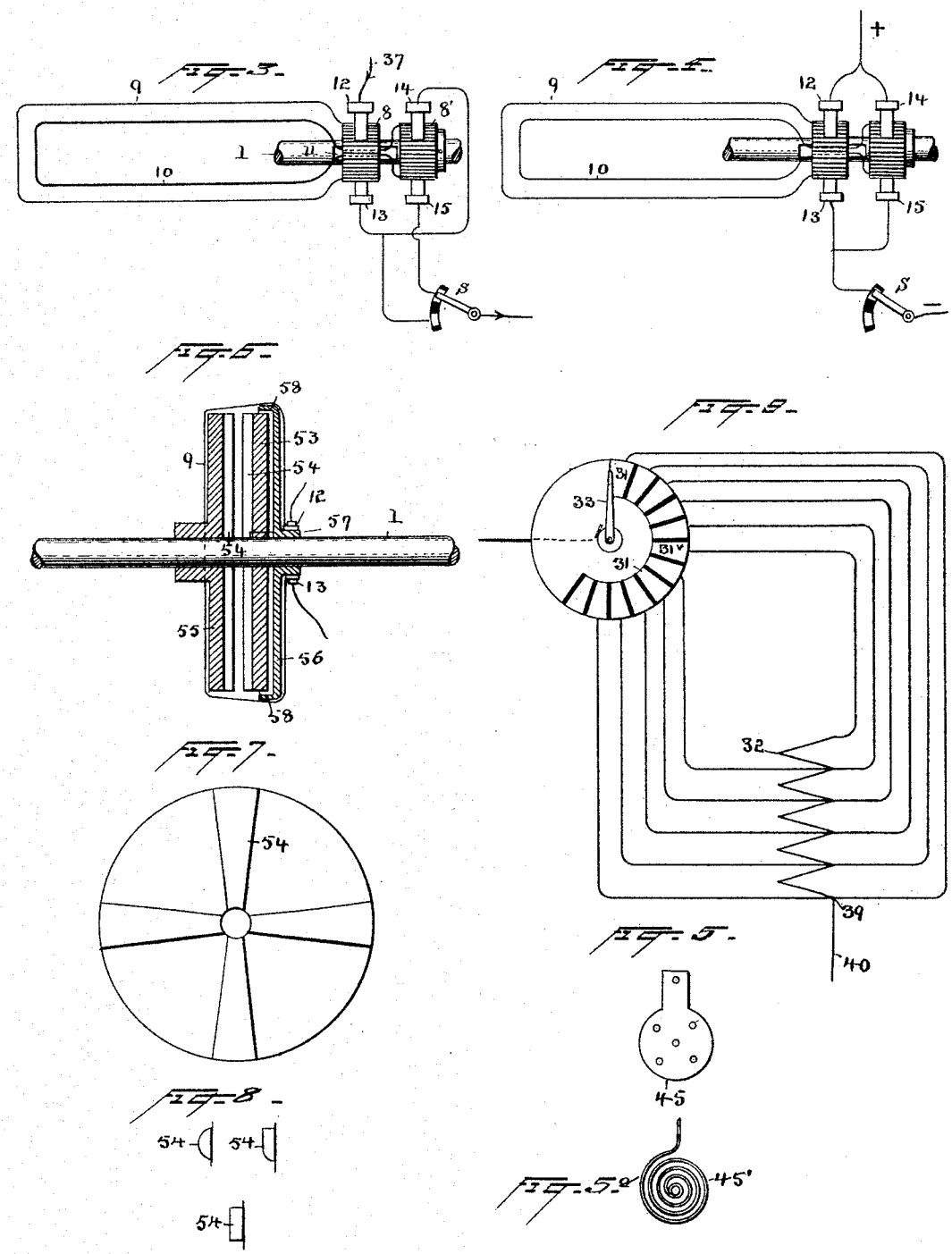

JOHN V. CAPEK, OF NEW YORK, N. Y., ASSIGNOR OF ONE-HALF TO EDWARD H. JOHNSON, OF SAME PLACE.

ELECTRIC MOTOR AND CONTROLLING APPARATUS FOR CARS.

SPECIFICATION forming part of Letters Patent No. 491,982, dated February 21, 1893.

Application filed November 14, 1891. Serial No. 411,913. (No model.)

*To all whom it may concern:*

Be it known that I, JOHN V. CAPEK, a citizen of the United States, residing at New York city, in the county and State of New York, have invented a certain new and useful Improvement in Electric Motors and Controlling Apparatus for Cars, of which the following is a specification.

The present invention relates to improved apparatus for driving cars or other machinery whereby the power is transferred from the motor to the driven shaft gradually and without mechanical friction, and whereby the motor can be controlled in an easy and efficient manner.

The invention consists in the improved motor, in the means for controlling said motor, and in the combination of said motor and means with a car axle or other driven shaft, and in certain other combinations, as hereinafter fully set forth.

In the accompanying drawings, Figure 1 shows two wheels and an axle of a car and a motor mounted thereon, said motor being in section; Fig. 2 shows a side view of the motor suspended below the body of the car, and means for controlling the motor; Fig. 2ª shows a detail of the motor; Figs. 3 and 4 are diagrams illustrating two methods of connecting the armature coils; Figs. 5 and 5ª are views of connecting devices employed in connection with the resistance; Fig. 6 is a modified form of motor embodying my invention; Fig. 7 is a face view of one section of the motor armature; Fig. 8 is a diagrammatic view showing three forms of ribs which may be employed in the armature; and Fig. 9 is a diagram of circuit connections.

The electric motor to be described surrounds the car axle 1, and consists of a field-magnet 2, and an armature constructed in two sections, an inner section consisting of disks or spiders 3 secured to the axle so as to rotate therewith, and carrying at their outer edges magnetic cross-bars 4; any suitable number of these may be employed; as shown in Fig. 2 there are eight. The outer section of the armature consists of disks or spiders 5, loosely mounted on the armature and carrying at their outer edges magnetic cross-bars 6, there being preferably as many bars 6 as there are bars 4. The disks 5 are preferably of steel and have bearings on the axle, and carry at the outer edges brass rings 7, on which the bars 6 are directly mounted.

8 is a commutator cylinder loosely surrounding the axle and movable with the outer section of the armature. The armature coil is wound over the outer section of the armature, as indicated by the single wire 9 in Fig. 1, and as indicated at 9′ in Fig. 2, this winding preferably being continuous and connected up as in the Siemens machine. The winding described surrounds both sections of the armature and magnetizes them, and ordinarily no additional winding will be needed on the inner section, but to provide for cases in which a stronger pull is desired, the second section may also be wound. In such case as the construction above described, one winding would preferably surround, or be common to, both sections of the armature. This is shown in the diagrammatic views 3 and 4.

In Fig. 3, 9 indicates the coil of the outer armature section, this coil being connected to the commutator 8 as already described. 10 is a wire of low resistance wound on the inner section of the armature and connected to a second commutator 8′, the second commutator being fixed on the axle and rotating with it. The wires from the inner section of the armature are led through a slot 11 in the shaft of the commutator 8′ as indicated. With this arrangement the commutator brushes are connected so as to throw the coils 9, 10 in series. 12, 13 are the brushes of the first commutator, and 14, 15 the brushes of the second commutator, 13 and 14 being connected together, and the circuit entering at brush 12, passing through the armature coil 9 to brush 14, thence through the coil of the inner section to brush 15 and back to the generator. S is a switch, by means of which the central coil may be thrown out of circuit. The brushes 14, 15 are stationary instead of being adjustable like 12, 13. Instead of having the inner coil of low resistance as just described, it may be of high resistance as indicated by the light line 10 in Fig. 4, and the commutator brushes may be so connected that the inner and outer coils shall be in parallel.

Around the commutator cylinder 8, Fig. 1, is a brush-holder consisting of two rings 16 which are stationary, being supported from the field-magnet or other non-moving part of the apparatus. These rings have around their peripheries grooves which form tracks for the movable carriage or holder which supports the commutator brushes. This carriage consists of rings 17, 18 in metallic contact with the stationary ring 16. The rings 17, 18 are provided with projections 19 on one side, and 20 on the opposite side. The first mentioned projections are provided with screws 21, or other devices, which are adapted to move around in the grooves of the rings 16.

Between the rings 17, 18 and fitting over the projections 20 are two or more insulating rods or blocks 22; these are preferably of wood, and surrounding the same are metal sleeves 23, these being a little shorter than the blocks 22 so that they shall not electrically connect the rings 17, 18. The ring 17 carries a post 24, in which is a commutator brush 13. The ring 18 carries a similar post and brush (not shown). The ring 18 is formed at its outer periphery as a bevel-gear, and a gear 26, carried by the oblique shaft 27, which extends from the motor through the floor of the car to the position occupied by the driver, engages therewith. The upper end of this shaft is provided with a handle 28 for moving it, and a pointer 29 moving over a suitable dial 30. This dial is marked to indicate the condition of the motor brushes and circuit, or the speed of the car when the pointer is in different positions. Behind the dial is a series of contact plates 31, which are connected to an adjustable resistance 32. When the pointer is in the position shown in Fig. 2, the commutator brushes are supposed to be in the positions of greatest efficiency, and all of the resistance 32 is out of circuit. When the handle is turned to adjust the brushes to reduce the power of the motor at the same time the switch operates to close the circuit, first through one, then through two sections of the resistance, and so on until all the resistance is in circuit; this will be when the switch-arm 33 rests on the contact $31^V$. (See Fig. 9.) In this manner I economize current and reduce sparking as the brushes move toward the line of least efficiency. As the handle is turned farther the power of the motor is increased by adjustment of the brushes, and as the brushes approach the point at which the motor is reversed, the resistance is gradually thrown out of circuit by the contact succeeding $31^V$, thereby increasing the current sent to the motor. The switch-arm 33 is carried by an insulated sleeve 34 on the shaft, against which a contact brush 35 continuously bears.

36 is the wire leading from the source of current supply, for example, the trolley wire, to the field-magnet of the motor, thence the circuit extends by wire 37 to one of the commutator-brushes, through the armature coil to the opposite commutator brush, by wire 38 to the brush 35. From the lower connecting device 39 of the rheostat a wire 40 leads to the ground or return wire.

The resistance device which I prefer to employ consists of a metallic or other vessel 41, having a slit 42 along one side, and having an enamel or other insulating lining 43 within it. Within this receptacle is placed a resistance conductor in the shape of a quantity of graphite, mixed with fire-clay to increase its electrical resistance, this composition being indicated at 44. At intervals in the composition are metallic connecting devices 45, which preferably consist of iron plates in the form shown in Fig. 5 oxidized in fire and graphitized, or metallic spirals, 45', as shown in Fig. $5^a$. In constructing the rheostat I place one of these plates in the bottom of the vessel, place a definite amount of the conducting composition over it, then add another plate and so on until the desired number of divisions is obtained. The plates are perforated so that the composition being forced into said perforations (or between the convolutions of the spirals), forms practically a continuous column with means for connecting the external circuit to it at any desired point. It will be evident that the form of these plates and the metal of which they are made may be varied. When the spirals are employed the free end extends through the slit. The composition and the connecting devices can very readily be put in the inclosing vessel, being forced in from one end.

In order to reduce the temperature of the armature I introduce as much air as possible between the two sections thereof. To accomplish this I form passages 50, 51 in the ends of the bars 6, the first mentioned openings pointing in one direction and the other openings pointing in a reverse direction. Adjacent to said openings are deflecting plates 52 to aid in the introduction and expulsion of the air.

While I have described the two sections of the armature as being concentric and one within the other, this is not essential. In Fig. 6 is shown a form of armature in which the two sections stand side by side. 1 is the axle or armature shaft. 53 is an iron disk rigidly connected with the axle and forming one section of the armature core. This disk is provided with any suitable number of radial ribs or extensions 54, which ribs may be of either of the forms in cross section shown in Fig. 8, or they may be of other suitable shape. Facing the disk 53 is a second similar disk 55 loose on the axle and forming the other section of the armature. 56 is a non-magnetic spider or support having a loose bearing on the axle at 57, and extending around the outer periphery of the disk 53, as indicated at 58. On the hub formed at the bearing is mounted the commutator of the motor, and against the commutator segments bear the brushes 12, 13. The armature coil 9 is wound around the whole structure which has just been described. It will be clear that the coil is supported by and moved with the support 56 and the disk 55, and that these parts are free to move under the influence of the field-magnet independently of the inclosed section 53. It will be clear that as the loose section of the armature revolves under the influence of the field-magnet, it will tend to pull the section fixed to the axle along with it. The attraction will be lowest when the bars 4, or ribs 54, stand half-way between the bars 6, or the ribs 54 on the second section of the armature, and greatest while they are standing in the same radial line. When the motor is first started, the attraction will not be sufficient to overcome the inertia of the driven mechanism, but as the loose section of the armature revolves it will gradually transfer its motion to the other section and start the load in a very gradual and easy manner.

The arrangement described differs from old forms of magnetic clutches for transferring motion from an electric motor to a driven axle or shaft, in that the whole magnetic system forms a part of the motor itself, being surrounded and magnetized by the armature coil. There are other features of difference which will be apparent.

I do not desire to limit myself to all the features of construction and to the numerous details described, but

What I claim is—

1. The combination of a field-magnet, an armature in sections, one or more commutators for the armature, and circuit connections such that a section of the armature will be rotated by the effect of the field-magnet, and another section of the armature will be rotated by attraction of the first armature section, substantially as described.

2. The combination of a field-magnet, an armature shaft and an armature therefor, the armature being in sections, one section fast to the shaft, and one section free to rotate under the influence of the field-magnet, substantially as described.

3. The combination of a field-magnet, an armature shaft and an armature therefor, the armature being in sections one section fast to the shaft, and with or without a magnetizing coil and one section free to rotate under the influence of the field-magnet, the sections being included or surrounded by a common armature winding, said winding being supported so as not to interfere with the independent rotation of the sections, substantially as described.

4. The combination of a field-magnet, an armature shaft and an armature therefor, the armature being in sections, one section fast to the shaft and with or without a magnetizing coil and one section free to rotate under the influence of the field-magnet, the sections being concentric and included or surrounded by a common armature winding, said winding being supported so as not to interfere with the independent rotation of the sections, substantially as described.

5. The combination of a field-magnet, an armature shaft, an armature therefor, the armature being in sections, one section fast to the shaft and one section free to rotate under the influence of the field-magnet, and an armature coil for each section, substantially as described.

6. The combination of a field-magnet, an armature shaft, an armature therefor, the armature being in sections, one section fast to the shaft and one section free to rotate under the influence of the field-magnet, and an armature coil for each section, the coils being connected to separate commutators, substantially as described.

7. The combination of a field-magnet, an armature shaft and an armature therefor, the armature being in sections, one section fast to the shaft and one section free to rotate under the influence of the field-magnet, each section having magnetic parts which attract similar parts on the other section, substantially as described.

8. The combination with a car and car-axle, of a motor having a field-magnet and an armature, the latter being in sections, one of which is connected to the axle and one of which is free to move independently thereof, substantially as described.

9. The combination with a car and car-axle, of a motor surrounding the axle and having a field-magnet and armature, the latter being in sections, one of which is connected to the axle and one of which is free to move independently thereof, substantially as described.

10. The combination with a car and car-axle, of a motor having a field-magnet and an armature, the latter being in sections, one of which is connected to the axle and one of which is free to move independently thereof, each section having magnetic parts which attract similar parts in the other section whereby the load is started gradually, substantially as described.

11. The combination of an armature made in sections independently rotatable, one fast to the shaft and one loose thereon of coils on said sections and means for connecting said coils to the same circuit, substantially as described.

12. The combination of an armature made in sections independently rotatable, one fast to the shaft and one loose thereon of coils on said sections, means for connecting said coils to the same circuit, and means for throwing one of said coils out of circuit, substantially as described.

This specification signed and witnessed this 23d day of October, 1891.

JOHN V. CAPEK.

Witnesses:
 CHARLES M. CATLIN,
 J. A. YOUNG.